(12) United States Patent
Lee et al.

(10) Patent No.: US 7,409,271 B2
(45) Date of Patent: Aug. 5, 2008

(54) ELECTRONIC DEVICE WITH HEIGHT ADJUSTING MECHANISM

(75) Inventors: Jian-Ming Lee, Taipei Hsien (TW); Yen-Lin Wang, Taipei (TW); Hung-Wen Liu, Taoyuan County (TW)

(73) Assignee: Qisda Corporation, Taoyuan (TW)

( * ) Notice: Subject to any disclaimer, the term of this patent is extended or adjusted under 35 U.S.C. 154(b) by 532 days.

(21) Appl. No.: 11/213,932

(22) Filed: Aug. 30, 2005

(65) Prior Publication Data
US 2006/0043255 A1    Mar. 2, 2006

(30) Foreign Application Priority Data
Sep. 1, 2004    (TW) .............................. 93126329 A

(51) Int. Cl.
    *G06F 7/00*    (2006.01)
(52) U.S. Cl. .......................................................... 701/1
(58) Field of Classification Search ...................... 701/1
    See application file for complete search history.

(56) References Cited

U.S. PATENT DOCUMENTS

| 5,533,268 | A | * | 7/1996 | Keightley .................... 33/290 |
| 6,195,901 | B1 | * | 3/2001 | Falb ............................. 33/286 |
| 6,461,002 | B1 | * | 10/2002 | Su ............................... 353/119 |
| 6,604,831 | B1 | * | 8/2003 | Prestigomo et al. ......... 353/119 |
| 6,715,890 | B2 | * | 4/2004 | Huang et al. ................ 353/119 |
| 2002/0113951 | A1 | * | 8/2002 | Huang et al. ................ 353/119 |
| 2006/0164612 | A1 | * | 7/2006 | Chen et al. .................. 353/119 |

FOREIGN PATENT DOCUMENTS

| TW | 456529 | 9/2001 |
| TW | 482304 | 4/2002 |

* cited by examiner

*Primary Examiner*—Yonel Beaulieu
(74) *Attorney, Agent, or Firm*—Muncy, Geissler, Olds & Lowe, PLLC

(57) ABSTRACT

An electronic device includes a base and an adjustment mechanism including an elevating member, a first elastic member, a moveable member and a damper. The elevating member has a plurality of grooves, and is moveably disposed on the base. The elastic member connects the elevating member and the base. The moveable member has an engaging portion, and is moveable between a first position and a second position. The damper connects with the elevating member to limit speed of the elevating member. When the moveable member is in the first position, the engaging portion is engaged with one of the grooves. When the moveable member is in the second position, the engaging portion is disengaged from the engaged groove so that the elevating member is moveable with respect to the base so as to adjust the height of the electronic device.

13 Claims, 9 Drawing Sheets

ELECTRONIC DEVICE WITH HEIGHT ADJUSTING MECHANISM

BACKGROUND

The invention relates to electronic devices, and in particular, to electronic devices with height adjusting mechanisms.

In an electronic device such as a projector, a base thereof must be adjusted to a predetermined projection angle by an adjustment mechanism.

Most of conventional adjustment mechanisms comprise a height adjusting screw for performing adjustment. It is difficult, however, to control the speed of the adjustment when raising or lowering the base, which may considered inconvenient.

SUMMARY

An electronic device with an adjustment mechanism is provided. The electronic device comprises a base and the adjustment mechanism thereon. An exemplary embodiment of an adjustment mechanism comprises an elevating member, a first elastic member, a moveable member, and a damper. The elevating member is moveably disposed on the base, and comprises a plurality of grooves. The first elastic member connects the elevating member and the base. The moveable member is moveable between a first position and a second position, and comprises an engaging portion to engage with one of the grooves. The damper connects with the elevating member to limit speed of the elevating member. When the moveable member is in the first position, the engaging portion is engaged with one of the grooves. When the moveable member is in the second position, the engaging portion is disengaged from the engaged groove so that the elevating member is moveable with respect to the base so as to adjust the height of the electronic device.

Furthermore, the adjustment mechanism comprises a fixed member and a second elastic member. The damper may be a damping gear, and the elevating member comprises a rack meshed with the damping gear. The fixed member is connected to the base, and comprises a first protrusion. The moveable member comprises a slot to receive the first protrusion so that the moveable member is moved along a predetermined direction. Note that the predetermined direction the moveable member moved along is substantially perpendicular to a moving direction of the elevating member. The second elastic member may be a compression spring, and is combined with the moveable member to return the moveable member to the first position.

Moreover, the adjustment mechanism further comprises a connecting member and a pin. The connecting member connects the elevating member and the first elastic member. The elevating member further comprises a first through hole. The connecting member comprises a second through hole corresponding to the first through hole. The pin passes through the first and second through holes to fix the connecting member to the elevating member.

Additionally, the elevating member further comprises a through hole. The connecting member further comprises a second protrusion inserting into the through hole to locate the connecting member on the elevating member. The connecting member comprises a notch, and the first elastic member comprises a step portion engaging the notch.

Note that the first elastic member may be a leaf spring or a tension spring.

DESCRIPTION OF THE DRAWINGS

The invention can be more fully understood by reading the subsequent detailed description and examples with references made to the accompanying drawings, wherein:

FIG. 2b is a side view of the assembled adjustment mechanism in FIG. 2a;

DETAILED DESCRIPTION

Figure 1:
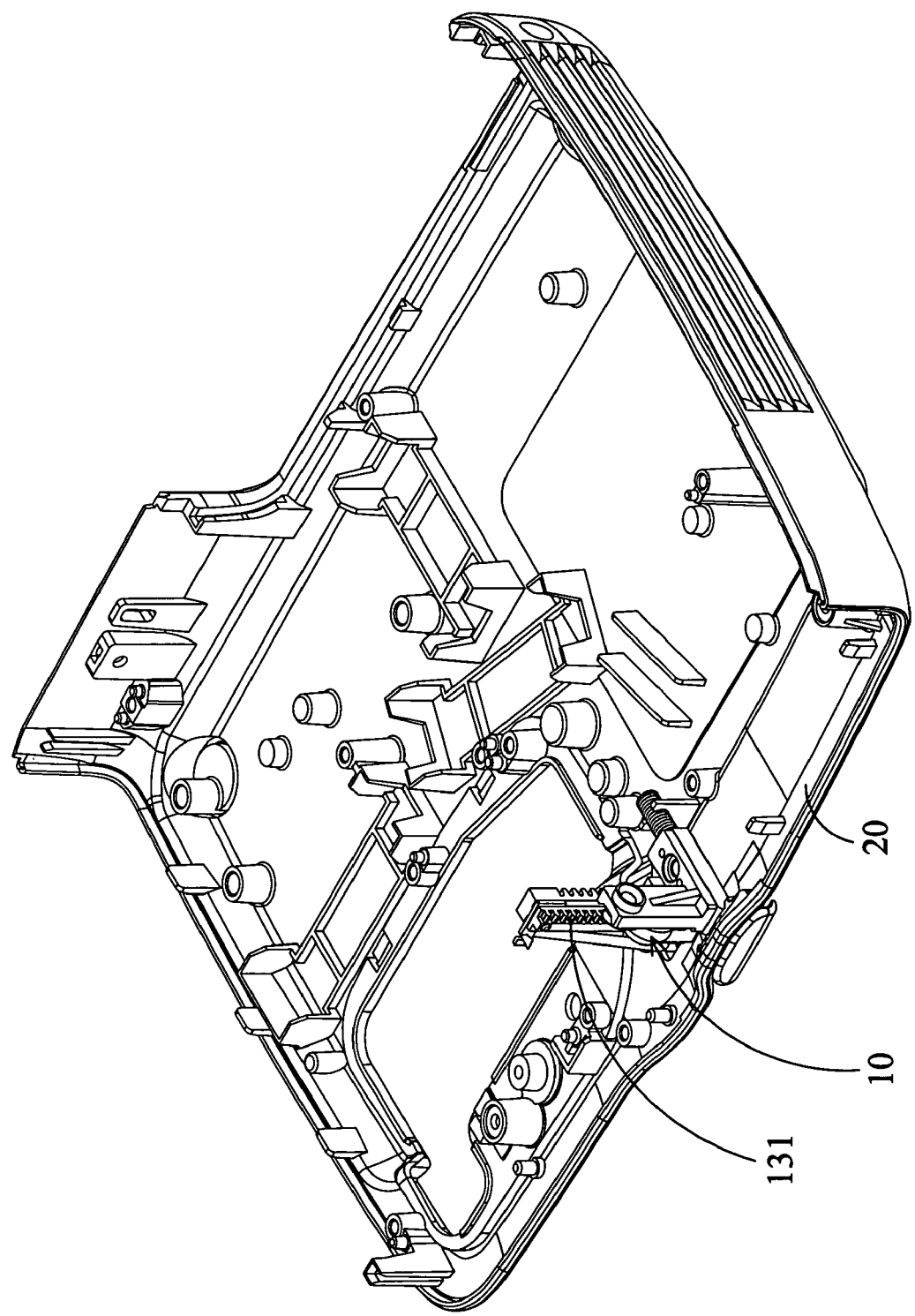
FIG. 1 is a schematic view of an embodiment of an electronic device.

FIG. 1 depicts an embodiment of an electronic device 1 comprising an adjustment mechanism 10 and a base 20. Note that the electronic device 1 may comprise other components which are omitted in the drawings for simplicity.

Figure 2A:
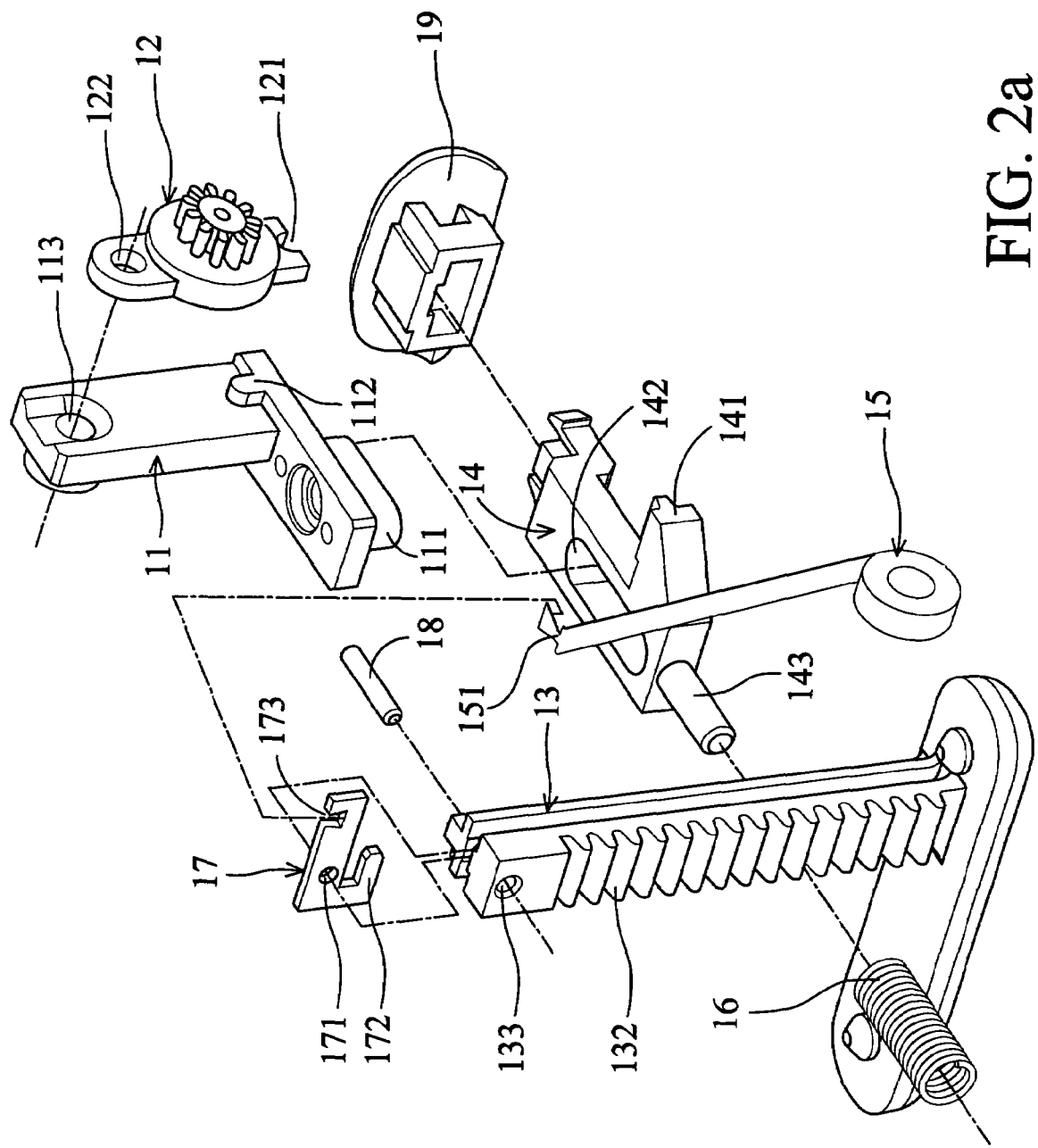
FIG. 2a is an exploded view of an adjustment mechanism in FIG. 1.
Figure 2B:
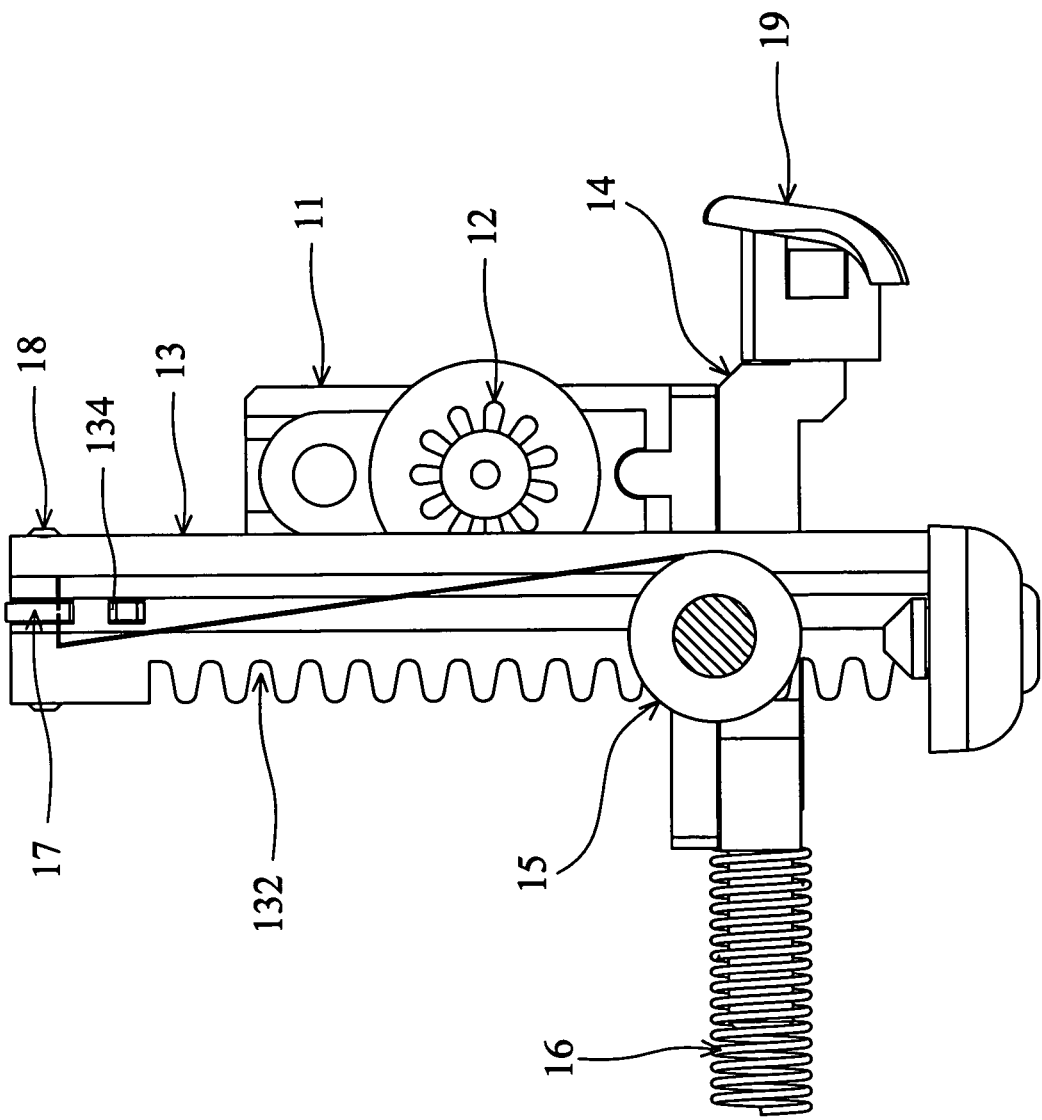

Referring to FIG. 2a, the adjustment mechanism 10 comprises a fixed member 11, a damper 12, an elevating member 13, a moveable member 14, a first elastic member 15, a second elastic member 16, a connecting member 17, a pin 18, and a button 19. The fixed member 11 is connected to the base 20, and comprises a first protrusion 111, a second protrusion 112, and a through hole 113. The first protrusion 111 is formed at a bottom surface of the fixed member 11. The second protrusion 112 is formed at a side of the fixed member 11. The through hole 113 is formed near the top of fixed member 11. The damper 12 comprises a notch 121 and a through hole 122. The damper 12 is positioned on the fixed member 11 by inserting the second protrusion 112 into the notch 121, and is fixed to the fixed member 11 by a screw (not shown) passing through the through holes 113 and 122. The damper 12 limits the elevation speed of the elevating member 13 to smooth the movement of the elevating member 13. While the damper 12 is a damping gear in FIG. 2a, it is not limited thereto, and may be a torsion spring or a spring.

The elevating member 13 is moveably disposed on the base 20, and comprises a rack 131, a plurality of grooves 132, a first through hole 133, and a second through hole 134. The rack 131 is meshed with the damper 12. The grooves 132 are opposite to the rack 131.

The moveable member 14 is disposed on the base 20 to be moveable between an idle position (shown in FIG. 3a and hereinafter referred as a first position) and a pressed position (shown in FIG. 3b and hereinafter referred as a second position). The moveable member 14 comprises an engaging portion 141, a slot 142, and a rod 143. When the moveable member 14 is in the first position, the engaging portion 14 is engaged with one of the grooves 132 of the elevating member 141. The first protrusion 111 of the fixed member 11 is received in the slot 142 so that the moveable member 14 moves along a predetermined direction. Note that the predetermined direction the moveable member 14 moved along is substantially perpendicular to a moving direction of the elevating member 13.

One end of the first elastic member 15 is connected to the base 20, and the other end thereof is connected to the elevating member 13 via the connecting member 17 so that the elevating member 13 is moveable with respect to the base 20.

The first elastic member 15 comprises a step portion 151 at the end connecting the connecting member 17. In FIG. 2a, the first elastic member 15 is a leaf spring, but it is not limited thereto, and may be a tension spring.

The second elastic member 16 is disposed on the rod 143 to be combined with the moveable member 14 to return the moveable member 14 to the first position. In FIG. 2a, the second elastic member 16 is a compression spring.

The connecting member 17 is disposed at the top of the elevating member 13, and comprises a through hole 171, a protrusion 172, and a notch 173. The connecting member 17 is fixed to the elevating member 13 by passing the pin 18 through the first through hole 133 of the elevating member 13 and the through hole 171 of the connecting member 17. The connecting member 17 is located on the elevating member 13 by inserting the protrusion 172 into the second through hole 134. The connecting member 17 connects the first elastic member 17 by engaging the step portion 151 and the notch 173.

The button 19 is combined with the moveable member 14, and is exposed by the base 20 so as to be conveniently pressed. To adjust the height of the base 20, the moveable member 14 is moved to the second position from the first position by pressing the button 19 so that the protrusion 141 is disengaged from the groove 132. Specifically, when the base 20 is moved to a position shown in FIG. 4b from a position shown in FIG. 4a, the button 19 is pressed while the base 20 is slightly elevated to provide space for the elevating member 13 to move downward. At this time, the elevating member 13 is moved downward from the first position by the first elastic member 15 until the button 19 is released to engage the engaging portion 141 and the groove 132 again, as shown in FIG. 3c.

Figure 3A:
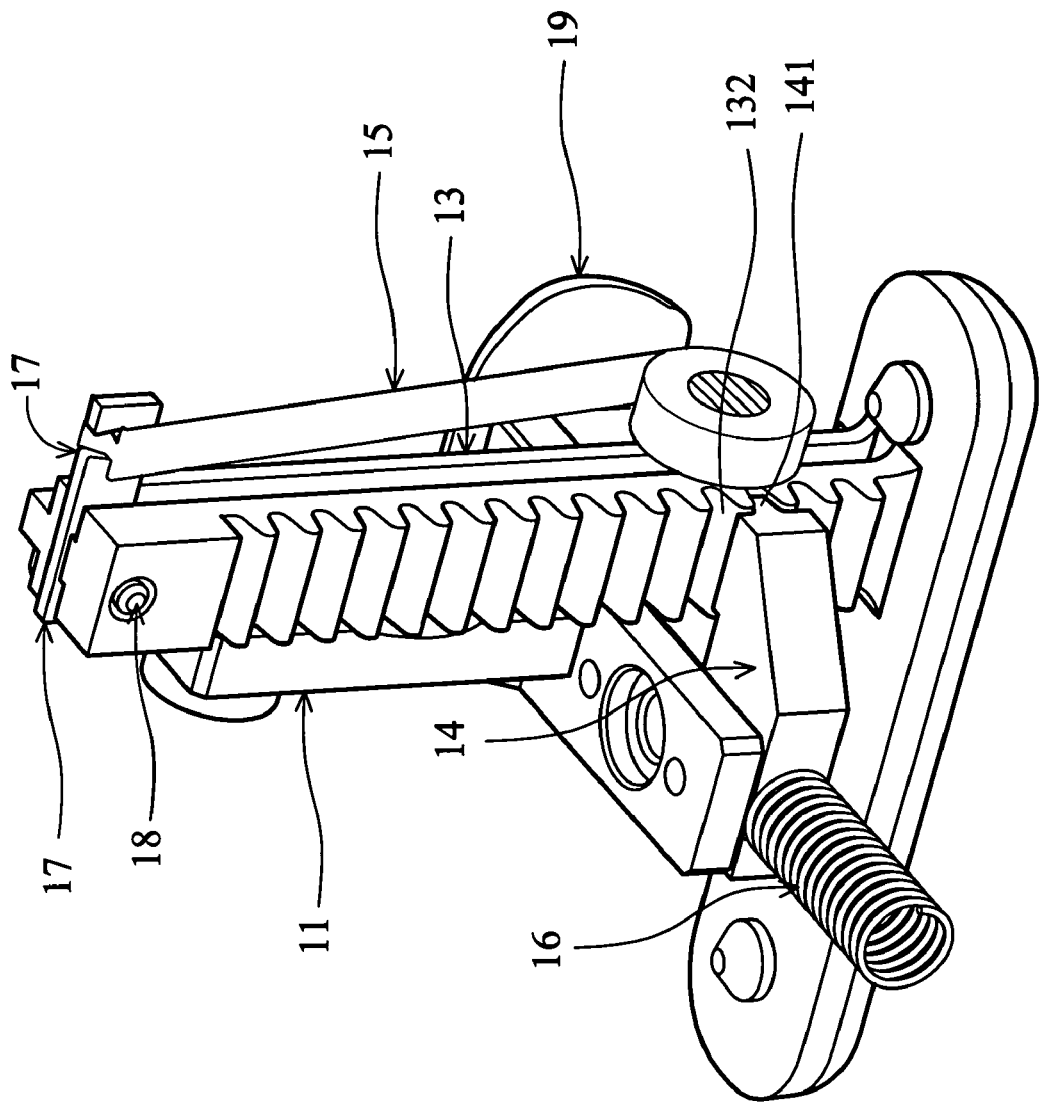
FIGS. 3a, 3c, and 3d are perspective views of the assembled adjustment mechanism in FIG. 2a, wherein a moveable member is in a first position.
Figure 3B:
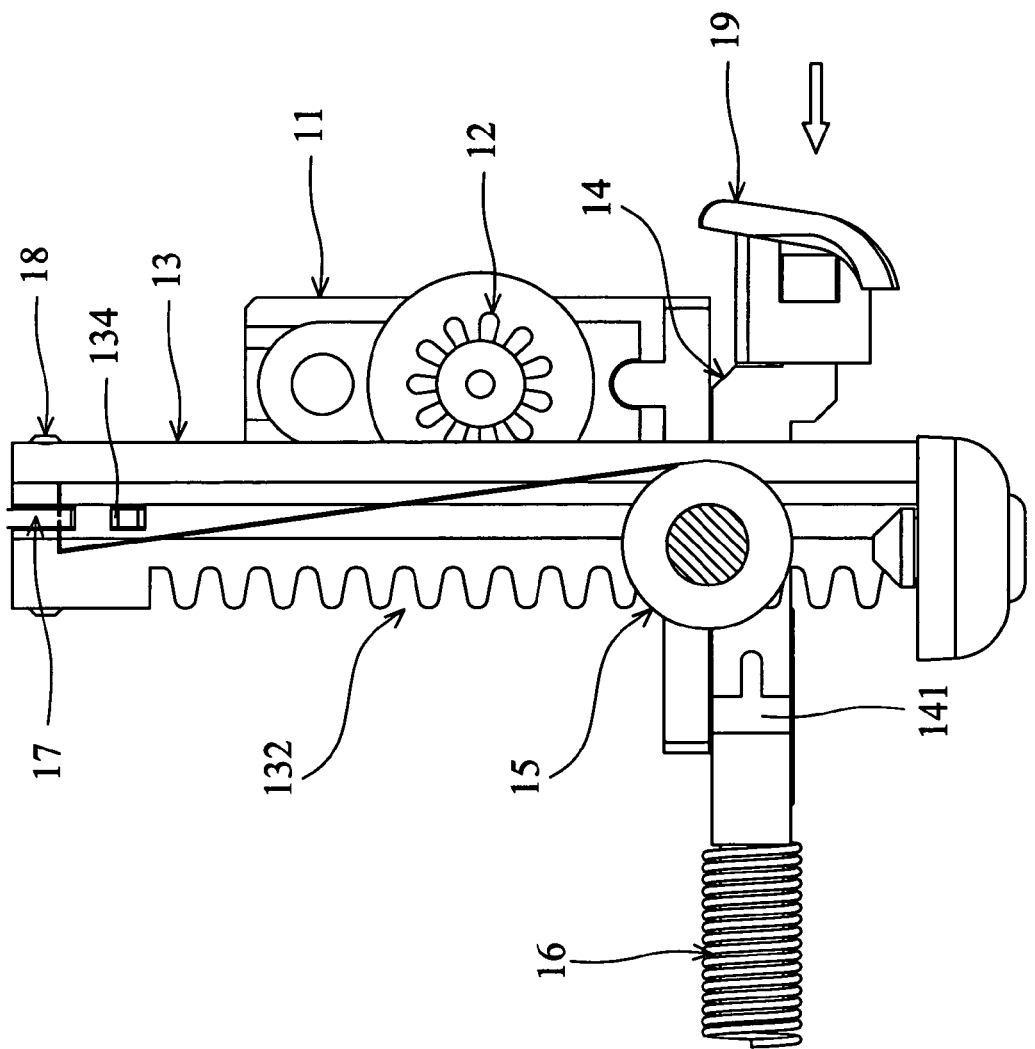
FIG. 3b is a side view of the assembled adjustment mechanism in FIG. 2a, wherein the moveable member is in a second position.
Figure 3C:
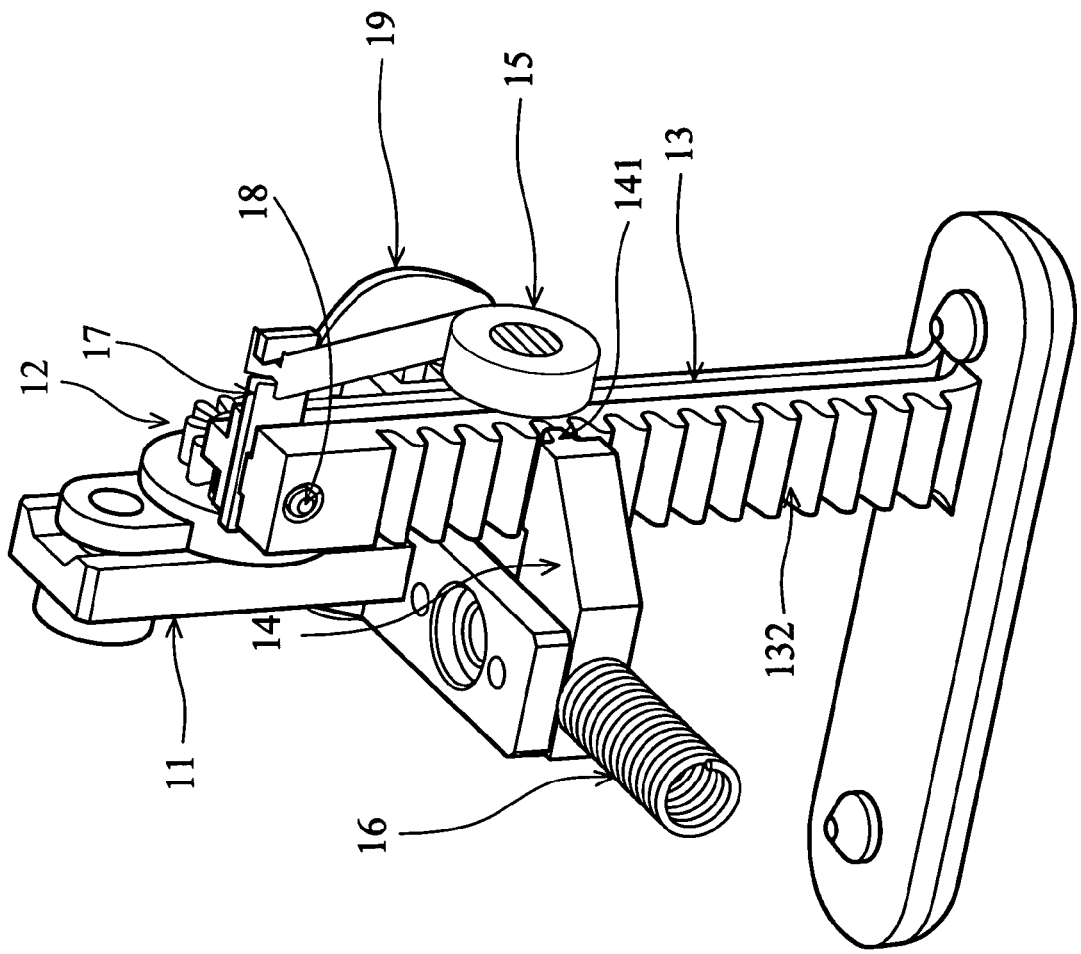
Figure 3D:
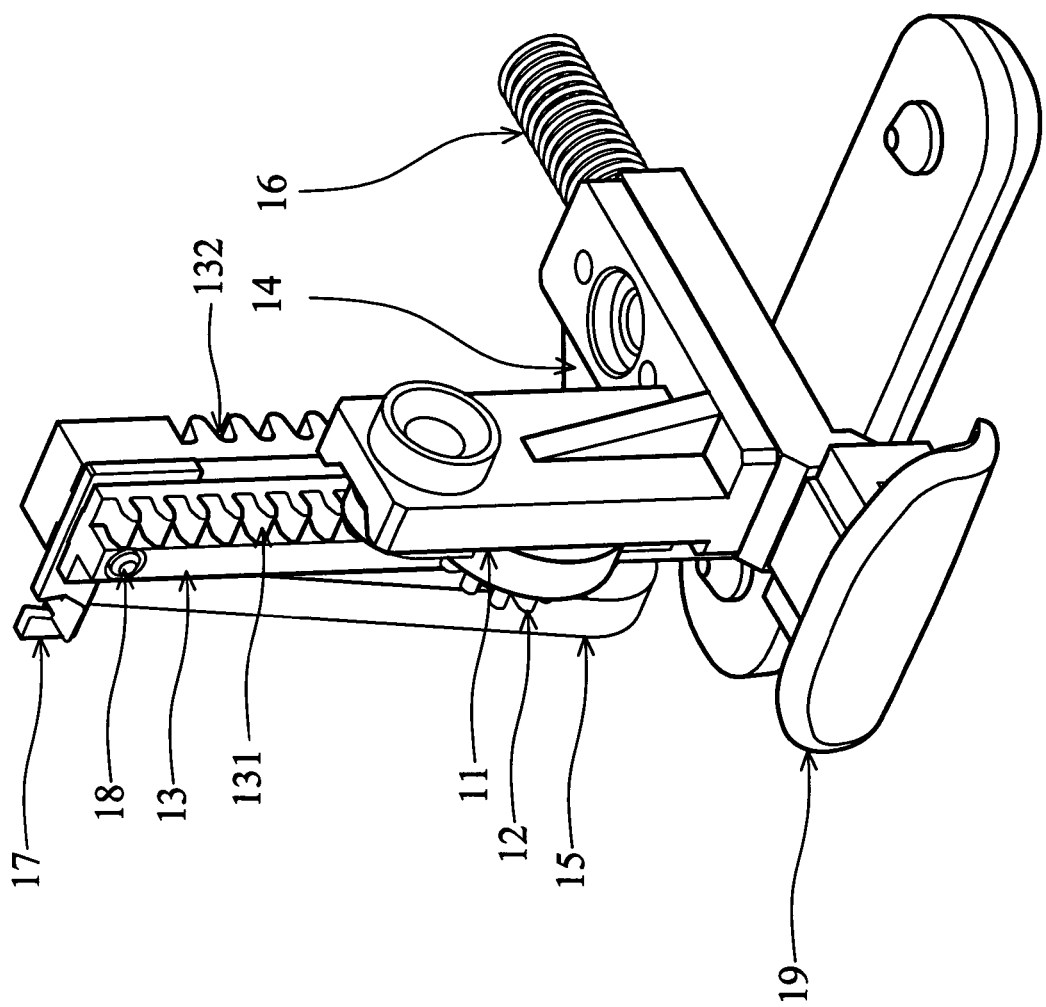
Figure 4A:
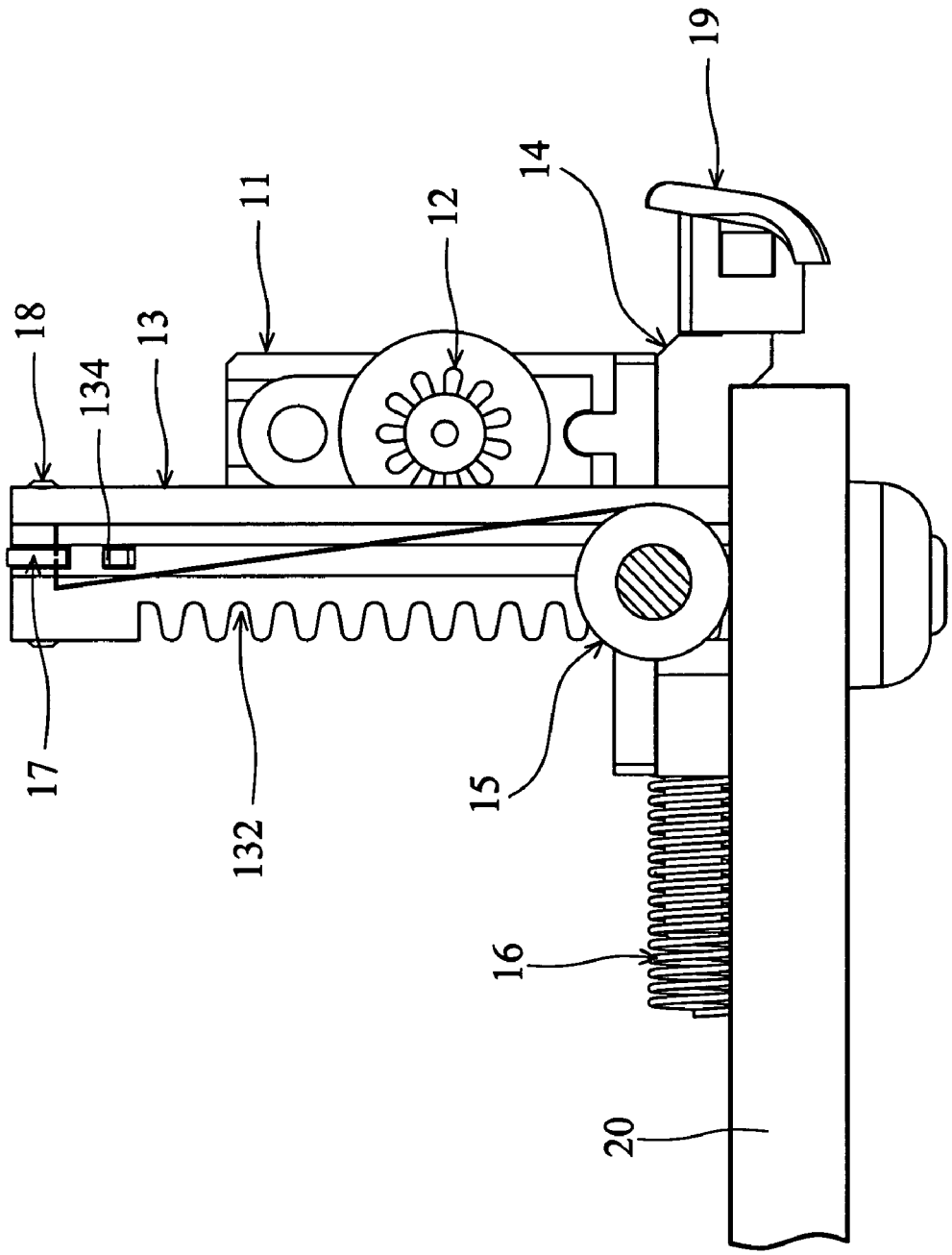
FIG. 4a is a partial side view of the electronic device in FIG. 1.
Figure 4B:
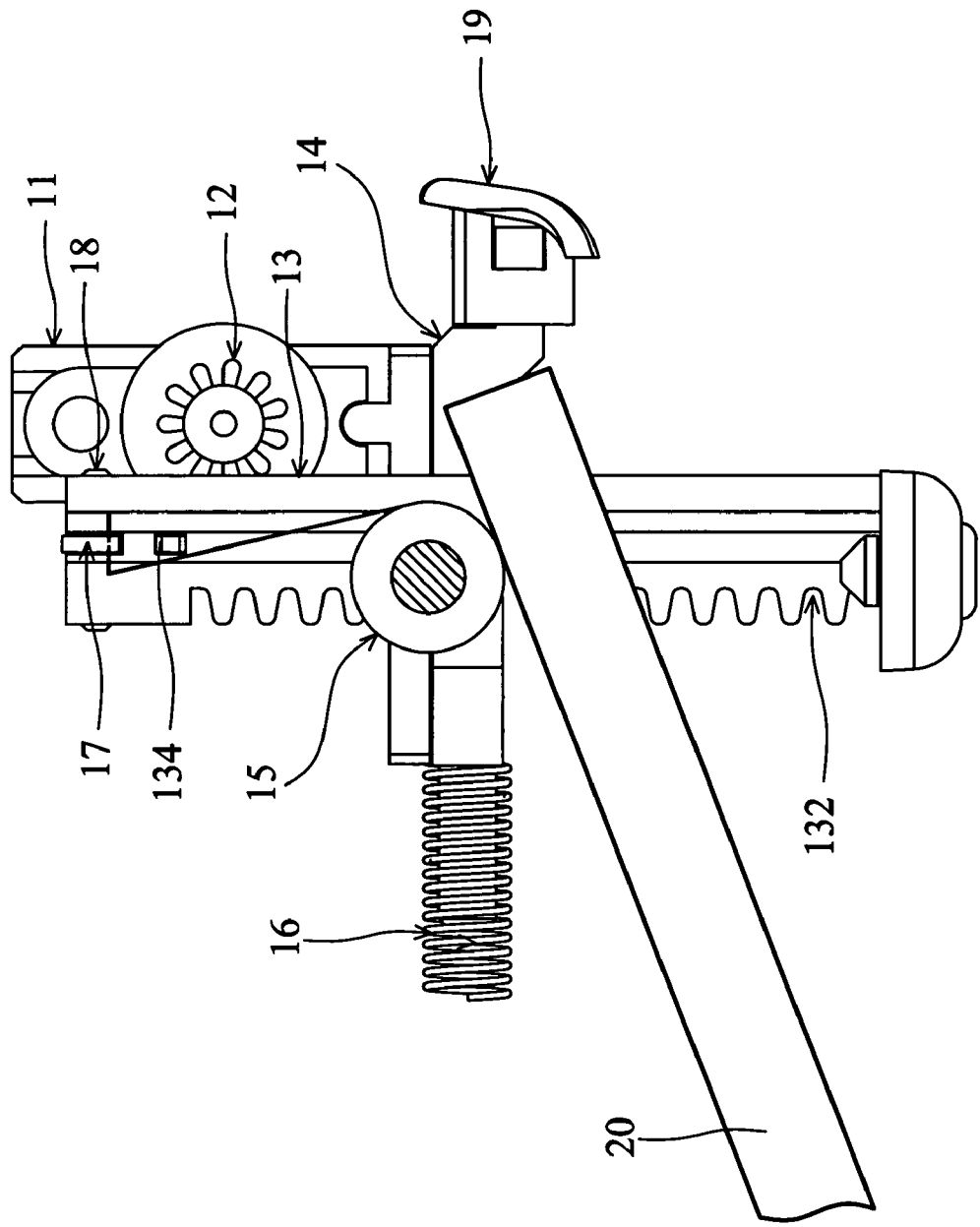
FIG. 4b is another partial side view of the electronic device in FIG. 1, wherein a base is elevated.

When the base 20 is returned to the position shown in FIG. 4a from the position shown in FIG. 4b, the button 19 is pressed so that the elevating member 13 is moved upward from the second position by the base 20 due to the weight of the electronic device 1 or external force until the button 19 is released to engage the engaging portion 141 and the groove 132 again, as shown in FIG. 3a.

As previously described, since the adjustment mechanism 10 in the electronic device 1 comprises elastic members 15 and 16, the base 20 may be conveniently adjusted by elastic force thereof. Furthermore, since the damper 12 may decrease the speed of the elevating member 13, the movement of the elevating member 13 may be smoother.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:
a base; and
an adjustment mechanism disposed on the base, including:
an elevating member, including a plurality of grooves, moveably disposed on the base;
a first elastic member connecting the elevating member and the base;
a moveable member, including an engaging portion to engage with one of the grooves, moved between a first position and a second position; and
a damper, connected with the elevating member to limit speed of the elevating member;
wherein when the moveable member is in the first position, the engaging portion is engaged with one of the grooves; when the moveable member is in the second position, the engaging portion is disengaged from the engaged groove so that the elevating member is moveable with respect to the base so as to adjust the height of the electronic device.

2. The electronic device as claimed in claim 1, wherein the damper is a damping gear, and the elevating member further includes a rack meshed with the damping gear.

3. The electronic device as claimed in claim 1, further including a fixed member, connected to the base, on which the damper is disposed.

4. The electronic device as claimed in claim 3, wherein the fixed member includes a protrusion, the moveable member includes a slot to receive the protrusion so that the moveable member is moved along a predetermined direction.

5. The electronic device as claimed in claim 4, wherein the predetermined direction the moveable member moved along is substantially perpendicular to a moving direction of the elevating member.

6. The electronic device as claimed in claim 1, further including a second elastic member combined with the moveable member to return the moveable member to the first position.

7. The electronic device as claimed in claim 6, wherein the second elastic member is a compression spring.

8. The electronic device as claimed in claim 1, further including a connecting member connecting the elevating member and the first elastic member.

9. The electronic device as claimed in claim 8, further including a pin, wherein the elevating member further includes a first through hole, the connecting member includes a second through hole corresponding to the first through hole, and the pin passes through the first and second through holes to fix the connecting member to the elevating member.

10. The electronic device as claimed in claim 8, wherein the elevating member further includes a through hole, and the connecting member further includes a protrusion inserting into the through hole to locate the connecting member on the elevating member.

11. The electronic device as claimed in claim 8, wherein the connecting member includes a notch, and the first elastic member includes a step portion engaging the notch.

12. The electronic device as claimed in claim 1, wherein the first elastic member is a leaf spring.

13. The electronic device as claimed in claim 1, wherein the first elastic member is a tension spring.

* * * * *